(12) United States Patent
Syed et al.

(10) Patent No.: US 8,977,591 B1
(45) Date of Patent: Mar. 10, 2015

(54) TRANSITIVE DATABASE REPLICATION

(75) Inventors: Zaheeruddin Syed, Irvine, CA (US);
Madhu Bhimaraju, Irvine, CA (US);
Anil Kumar, Spotswood, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 201 days.

(21) Appl. No.: 13/154,948

(22) Filed: Jun. 7, 2011

(51) Int. Cl.
*G06F 7/00* (2006.01)
*G06F 17/00* (2006.01)

(52) U.S. Cl.
USPC ........................................................ 707/612

(58) Field of Classification Search
USPC ........................................................ 707/612
See application file for complete search history.

(56) References Cited

U.S. PATENT DOCUMENTS

| | | | |
|---|---|---|---|
| 6,438,538 B1 * | 8/2002 | Goldring | 1/1 |
| 7,702,698 B1 | 4/2010 | Chakravarthy | |
| 2002/0199024 A1 * | 12/2002 | Givoly et al. | 709/248 |
| 2007/0156781 A1 * | 7/2007 | Kapoor et al. | 707/202 |
| 2008/0270486 A1 * | 10/2008 | Hind et al. | 707/201 |
| 2009/0313311 A1 * | 12/2009 | Hoffmann et al. | 707/204 |
| 2010/0161551 A1 * | 6/2010 | Whynot | 707/610 |
| 2010/0250491 A1 | 9/2010 | Jin et al. | |
| 2011/0110515 A1 * | 5/2011 | Tidwell et al. | 380/200 |

* cited by examiner

*Primary Examiner* — Hosain Alam
*Assistant Examiner* — Van Oberly (57) ABSTRACT

A database is replicated to other systems using multisite table(s) and associated replication trigger logic. Each system includes a main table, multisite table(s) and replication trigger logic. A multisite table corresponds to a main table of another system. When a main table of a system is changed, in response to an input, the system generates and sends replication transactions to the other systems for changing main tables in the other systems. In accordance with the change specified in the replication transaction, the multisite tables are modified. In each system, the replication trigger logic determines whether or not to replicate the change specified in the replication transaction to the main table of the each system, upon application of the replication trigger logic to the replication transaction. The change specified in the replication transaction may relate to inserting, deleting, or updating a record in the main table.

21 Claims, 7 Drawing Sheets

TRANSITIVE DATABASE REPLICATION

TECHNICAL FIELD

The present subject matter relates to database replication techniques, in particular to techniques for replicating data across multiple systems located at different sites.

BACKGROUND

Having a scalable, robust replication system for business data is critical to business operation, and thus, business data are often replicated to other systems located at different geographic sites. Replicating data to other systems across different sites is often called a multisite based replication technique and is used to improve operational continuity in doing business because the multisite based replication technique provides increased availability of data for business and improves operational performance by balancing network loading among multiple database systems.

Data accuracy, data availability, and conflict resolution are considerations for the implementation of data replication systems and maintenance of such systems. Data accuracy relates to accuracy of data being replicated and is sometimes referred to as data integrity. Data availability is availability of data for use even in case of a system failure or system unavailability. Conflict resolution is a procedure used when two transactions originating from different systems occur for the same record at nearly the same time.

Currently, there are a number of existing techniques for replicating data across multiple systems located at different sites. One example is hardware based replication. Hardware based replication replicates all changes from one system (or a primary system) to another (or a secondary system) in a synchronous manner at a hardware disk level such that every change made on the primary system is simultaneously made on the secondary system. Data of the secondary system is not made accessible until it is needed. But, when users are switched to the secondary system, the secondary system contains all the changes that were made to the primary system. One complication with hardware based replication is that since data is simultaneously replicated at a hardware disk level, operating systems and database versions running on each system generally must have exact matches. Thus, hardware based replication is generally more expensive than a software based solution because this exact matching of hardware and/or software between the primary and secondary systems must be maintained.

There are software based techniques for replicating data. Some software based techniques replicate data synchronously, allowing changes to a primary system only after the same changes have been made to a secondary system. This technique, however, tends to reduce application performance because of the increased amount of communication between the primary and secondary systems, and causes possible delays on the secondary system, before allowing a transaction to complete.

Other software based techniques replicate data asynchronously, providing various levels of completeness, accuracy, performance, latency and flexibility in replicating the data. One example is a master-to-slave replication technique, in which one system acts as a primary (or master) system and the other systems perform as secondary (or slave) systems. The slave systems always follow the master system. Write operations are only performed on the master system, but read operations can be performed on the master and slave systems alike. In some cases, any of the systems can serve as the master system, but at any given time only one master system exists.

In the master-to-slave replication technique, all inserts, deletes, and updates are submitted only to the master system, and are then replicated to other slave systems. In addition, all write operations (or transactions) are made directly to a main table of data of the master system and subsequently replicated to main tables of data of the slave systems. Thus, by having only a single system (e.g., a master system) that accepts write transactions, there is no issue with data accuracy and conflict resolution. However, implementing master-to-slave replication requires a complex implementation architecture, and switching operation of a system from serving as a master system to serving as a slave system (and vice versa) can create many complex challenges. Further, limiting write transactions to a single master system often introduces significant capacity and latency issues for high volume and/or a geographically distributed configuration of systems.

Because of the architectural complexity and implementation challenges encountered in the master-to-slave replication, a technique known as peer-to-peer replication is often preferred for a multisite based replication system. Peer-to-peer replication allows users to make changes concurrently to the same table across multiple active systems because all of the systems act as peers. Peer-to-peer replication allows any local change on a system to be replicated to all of the other systems, keeping all databases in synchronization with each other. In other words, if a record in a main table of a first system is changed, then the change or transaction is replicated to the main tables of the other systems. For example, when inserting a new record on a system A, an insert transaction is generated and replicated directly on the main tables of the other systems (e.g., systems B, C, etc). For deleting a record on the system A, a delete transaction is generated and replicated directly to the main tables of the other systems. Similarly, for updating a record on the system A, an update transaction is generated and replicated directly to the main tables of the other systems. However, replicating data directly to the main tables of the other systems tends to create conflicts and reduce data integrity.

Common types of conflicts encountered in peer-to-peer replication are: insertion conflicts, update conflicts, and delete conflicts. An insertion conflict occurs when two or more systems simultaneously attempt to insert records with the same key in the same table. An update conflict occurs when simultaneous updates by two or more systems are performed on the same record. A deletion conflict occurs when one system deletes a record that another system updates before the delete transaction is implemented.

With existing peer-to-peer replication techniques, accuracy of data is not guaranteed in view of such conflicts. Further, with the existing peer-to-peer replication techniques, a transaction can loop across multiple systems since there is no mechanism to stop the transaction at the originating system. Coping with these inherent shortcomings with the existing peer-to-peer replication techniques often requires major compromises in database design, which might not be practical when prepackaged third party applications are used. Furthermore, the existing peer-to-peer replication techniques require often complex routines for resolving the conflicts and for prioritizing which replicated transactions are accepted for posting to target systems when two or more users change the same record at or near the same time.

SUMMARY

The teachings herein alleviate one or more of the above noted problems and/or improve over the existing database replication techniques.

An exemplary technique, referred to as "transitive database replication," replicates data to other systems with improved data accuracy and conflict resolution over other existing peer-to-peer techniques. In transitive database replication, each system at a site includes a main table of data for the system, one or more multisite tables corresponding to the main tables of data for the other systems, and associated replication trigger logic. A multisite table is defined as a table of data corresponding to a main table of a different system.

For replicating data across multiple systems, in response to inputs, changes are first replicated to the multisite tables, and then made to the main tables via replication trigger logic. Thus, replicating to the multisite tables serves as an intermediate step in the replication process, and thereby reducing the chances of having conflicts due to replicating data directly to the main tables. In addition, the latest data from each system is always present in the multisite tables in the other systems.

As a result, data availability and data accuracy across multiple systems are significantly improved via transitive database replication.

Other concepts relate to unique software for implementing a transitive database replication technique. Using the transitive database replication technique, as described below, a database can be replicated to different systems.

A first system maintains a main table of data (or a database) for the first system and a multisite table of data corresponding to a main table of data of a second system. When the first system receives an input for changing the main table of the first system (e.g., inserting, deleting, or updating a record in the main table of the first system), the main table of the first system is changed accordingly. For replicating the change to the second system, the first system generates and transmits to the second system a first replication transaction, corresponding to the change in the main table of the first system. The second system then changes the multisite table in the second system, based on the first replication transaction. Subsequently, the main table of the second system is changed (e.g., a record is inserted, deleted, or updated in the main table of the second system), based on application of replication trigger logic to the first replication transaction.

Similarly, when the second system receives an input for changing the main table of the second system, the main table of the second system is changed based on the input (e.g., an insert, delete, or update of a record in the main table of the second system). For replicating the change to the first system, the second system generates and sends to the first system a second replication transaction, corresponding to the change in the main table of the second system. The first system receives the second replication transaction and then changes the multisite table in the first system based on the received second replication transaction. Subsequently, the main table of the first system is changed (e.g., a record is inserted, deleted, or updated in the main table of the second system), based on application of replication trigger logic to the second replication transaction.

In both systems, for inserting a new record in the main table, the replication trigger logic determines whether or not a record corresponding to the new record already exists in the main table; for deleting an existing record, the replication trigger logic determines whether or not a record corresponding to the existing record for deletion is present in the main table; for updating a record with update information, the replication trigger logic determines first whether or not a record with the update information already exists in the main table and then determine whether or not to replicate the update in the main table.

Other concepts relate to a computer system for implementing such transitive database replication as outlined above. The computer system includes a processor, an interface for data communication, storage accessible to the processor, a main table of data, and multisite table(s) of data. The main table of data and multisite table(s) of data are maintained in the storage for the computer system, where the multisite table(s) of data correspond to main tables of data of other computer systems. The computer system further includes replication logic and replication trigger logic for configuring the computer system and implementing various functions required by transitive database replication, as described above.

Further, a software product, in accord with the present disclosure, includes at least one machine-readable medium and information carried by the medium. The information carried by the medium may be executable program code, one or more databases and/or information implementing transitive database replication, as described above.

Furthermore, a database system includes a plurality of computer systems implementing transitive database replication at multiple sites, as described above.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below. It is understood that other configurations of the subject technology will become readily apparent to those skilled in the art from the following detailed description, wherein various configurations of the subject technology are shown and described by way of illustration and example. As will be realized, the subject technology is capable of other configurations and its several details are capable of modification in various other aspects, all without departing from the scope of the subject technology. Accordingly, the drawings and detailed description are to be treated as illustrative in nature and not as restrictive.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

Reference now is made in detail to the examples illustrated in the accompanying drawings and discussed below.

Figure 1:
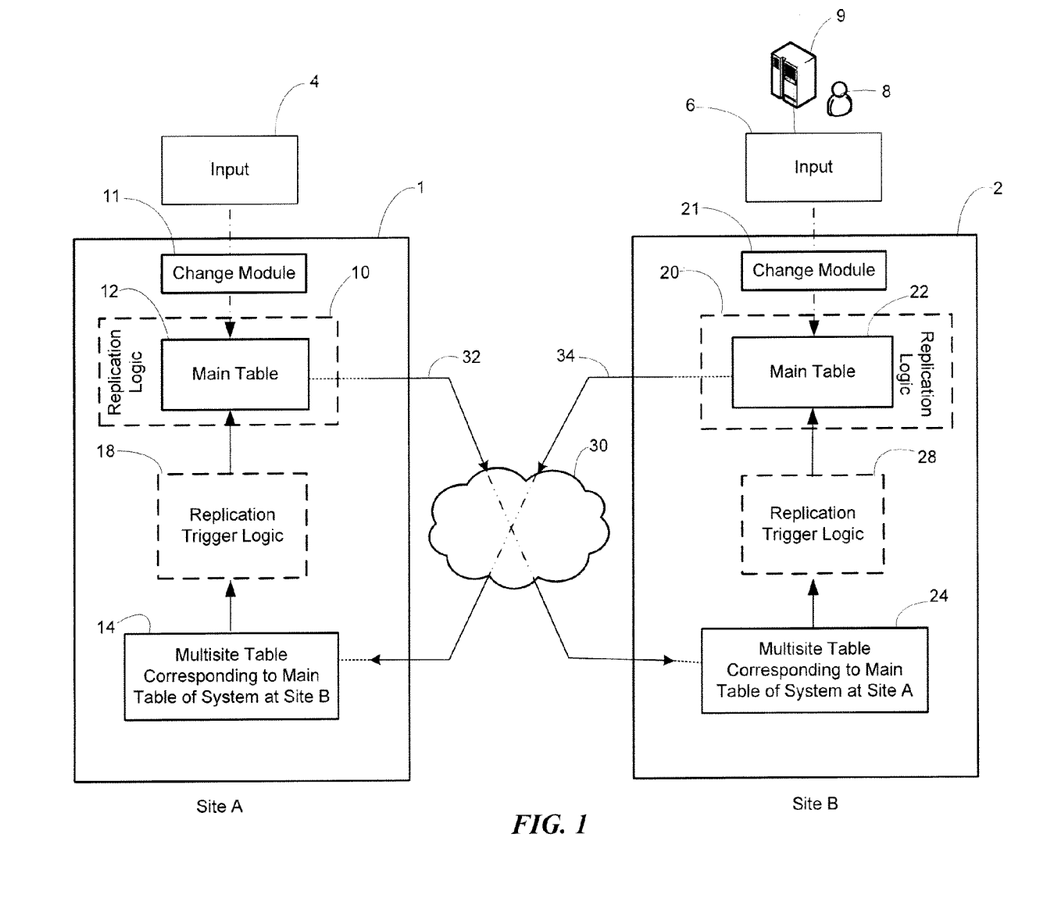
FIG. 1 is a simplified, conceptual diagram illustrating an implementation of transitive database replication between two systems.

FIG. 1 is a simplified, conceptual diagram illustrating an implementation of transitive database replication between two systems located at different sites. A site is a data center or a physical location housing one or more servers or database systems. For example, sites can be different geographical locations and systems can be located thousands miles apart at the sites (e.g., one located in New York, and another in San Jose). In some implementations, transitive database replication may be performed between systems located at a common site. For simplicity, discussion below is limited to implementing a transitive database replication technique between two systems; but as shown later (in FIG. 2), it can be expanded to include more than two systems.

As illustrated in FIG. 1, systems 1 and 2 are located at respective sites A and B. System 1 includes a main table 12 of data for the system 1, a multisite table 14 corresponding to a main table 22 of data for system 2, a change module 11, replication logic 10, and replication trigger logic 18. Similarly, the system 2 includes the main table 22 of data for the system 2, a multisite table 24 corresponding to the main table 12 for the system 1, a change module 21, replication logic 20, and replication trigger logic 28.

In the example, the main tables 12, 22 are repositories of data for their respective systems 1 and 2. Examples of such data include any type of information used for doing business, such as customer address book information including customer's name, telephone number(s), address(es), past transactions, etc. In some implementations, the data is stored in records, such as records of a relational database. Various examples herein refer to record-based data storage, but the disclosed subject matter is not limited to the record-based data storage. The main tables 12 and 22 are maintained in storage media (not illustrated) by systems 1 and 2. The multisite tables 14 and 24 are tables of data corresponding to the main tables of data of systems 2 and 1 respectively. That is, the multisite table 14 duplicates data stored in the main table 22 of the system 2. Similarly, the multisite table 24 duplicates data in the main table 12 of the system 1. The multisite tables are also maintained in storage media (not illustrated).

The replication logic 10 configures the system 1 to perform various functions described herein. The replication trigger logic 18 determines whether or not to replicate change information entered into the multisite table 14 to the main table 12. The replication logic 10 and replication trigger logic 18 can be implemented in software and/or hardware. Similarly, the replication logic 20 configures the system 2 to perform various functions described herein. The replication trigger logic 28 determines whether or not to replicate change information entered into the multisite table 24 to the main table 22. The replication logic 20 and replication trigger logic 28 can also be implemented in software and/or hardware as well.

As shown in FIG. 1, inputs can be entered into systems 1 and 2 by various means, e.g., by a user 8 or by another system 9 or a database, or the like.

When the system 1 receives an input 4 for changing the main table 12 by, for example, inserting, deleting, or updating a record in the main table 12, the change is implemented in the main table 12 by a change module 11, and the replication logic 10 generates a replication transaction 32 containing information about the received change for the main table 12. The change module 11 is a software module (e.g., a graphical user interface software) for receiving the change via the input 4 and modifying the main table 12 based on the input 4. The change module 11 not only implements the change based on the input 4 in the main table 12, but also determines when the other system 2 (or database) is to be changed via multisite table 24 and associated replication trigger logic 28. The replication logic 10 of system 1 transmits the replication transaction 32, via communication network 30, to the system 2. The replication transaction 32 can be sent out immediately upon the change in the main table 12 or at a predetermined time after the change. In the example, the replication transaction 32 is sent out immediately upon the change in the main table 12. In another example, however, the replication transaction 32 can be transmitted to the system 2 after a predetermined time which is set by, e.g., system parameters.

Communication network 30 allows for systems 1 and 2 to exchange data, and many techniques and technologies are well known to those skilled in the art for implementing the communication network 30, such as, but not limited to, private and/or public networks, the Internet, other interconnected networks, and the like. The system 2 receives the replication transaction 32 and performs the change specified in the replication transaction 32 (e.g., an insert, delete, or update of a record) on the multisite table 24 so that the change to the main table 12 of the system 1 has been made to the multisite table 24 in the system 2.

After the multisite table 24 is modified in accordance with the change information specified in the replication transaction 32, the replication trigger logic 28 determines whether or not to replicate the change specified in the replication transaction 32 to the main table 22 of the system 2. If a positive determination is made to replicate the change, the main table 22 is modified in accordance with the change information specified in the replication transaction 32 so that the change to the main table 12 of the system 1 has also been made to the main table 22 of the system 2, thereby completing the replication of the change from the system 1 to the system 2. The replication trigger logic 28 is a set of procedural statements for various functions (e.g., resolving conflicts, transforming data, and implementing changes in the main table 22). The replication trigger logic 28 is invoked whenever a change operation, such as an insert, delete, or update of a record, is to be performed on the main table 22; each change operation is performed by a corresponding set of procedural statements of the replication trigger logic 28.

Similarly, changes received at the system 2 can be replicated to the system 1. When the system 2 receives an input 6 for changing the main table 22 of the system 2 by, for example, inserting, deleting, or updating a record in the main table 22, the change is implemented in the main table 22 by a change module 21, and the replication logic 20 generates a replication transaction 34 containing information about the received change for the main table 22. The change module 21 is a software module (e.g., a graphical user interface software) for receiving the change via the input 6 and modifying the main table 22 based on the input 6. The change module 21 implements the change based on the input 6 in the main table 22, and determines when the system 1 is to be changed via the multisite table 14 and associated replication trigger logic 18. The replication logic 20 of the system 2 transmits the replication transaction 34, via communication network 30, to the system 1. Similarly, the replication transaction 34 can be sent out immediately upon the change in the main table 22 or at a predetermined time after the change. The system 1 receives the replication transaction 34 and performs the change specified in the replication transaction 34 (e.g., an insert, delete, or update of a record) on the multisite table 14 so that the change to the main table 22 of the system 2 has also been made to the multisite table 14 in the system 1. In the example, the replication transaction 34 is sent out immediately upon the change in the main table 22. In another example, however, the replication transaction 34 can be transmitted to the system 1 after a predetermined time which is set by, e.g., system parameters.

After the multisite table 14 is modified in accordance with the change information specified in the replication transaction 34, the replication trigger logic 18 determines whether or not to replicate the change specified in the replication transaction 34 to the main table 12 of the system 1. If a positive determination is made to replicate the change, the main table 12 is modified in accordance with the change information specified in the replication transaction 34 so that the change to the main table 22 of the system 2 has also been made to the main table 12 of the system 1, thereby completing the replication of the change from the system 2 to the system 1. The replication trigger logic 18 is a set of procedural statements for various functions (e.g., resolving conflicts, transforming data, and implementing changes in the main table 12). The replication trigger logic 18 is invoked whenever a change operation, such as an insert, delete, or update of a record, is to be performed on the main table 12; each change operation is performed by a corresponding set of procedural statements of the replication trigger logic 18.

Figure 2:
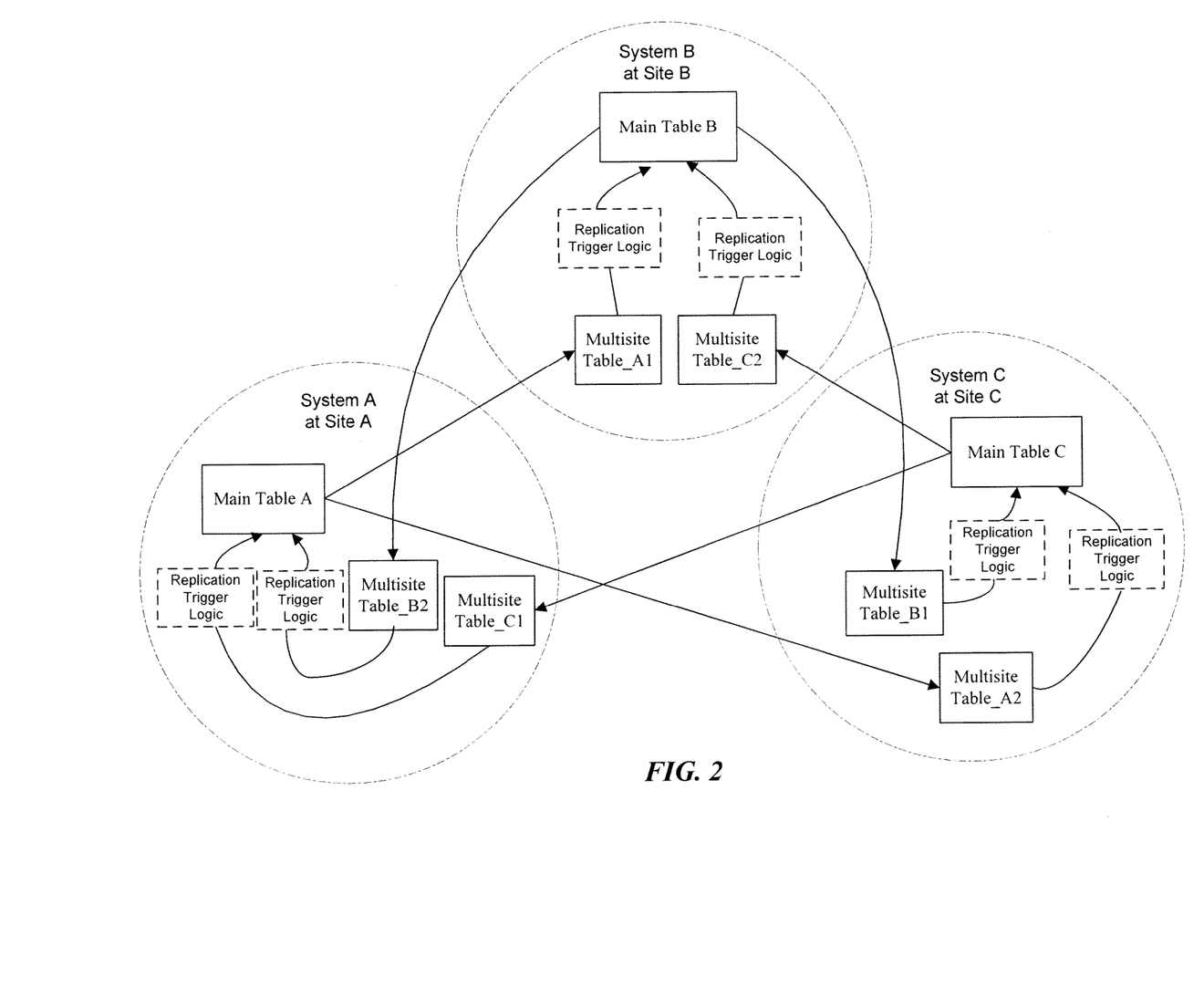
FIG. 2 is an illustrative example of an implementation of transitive database replication among multiple systems.

FIG. 2 illustrates another implementation of the disclosed subject matter in which transitive database replication is performed among three systems (e.g., systems A, B, and C) located at different sites. Those skilled in the art would understand in view of this disclosure that the disclosed technique can be applied to replicate data not only between two systems (as in FIG. 1) or three systems (as in FIG. 2), but can also be expanded to include many systems, provided sufficient system and network capacities for a given number of systems and transaction volume.

As illustrated in FIG. 2, each system includes a main table and a plurality of multisite tables; each multisite table corresponds to a main table of each of the other sites. In the example illustrated in FIG. 2, system A has a main table, Main Table A, and two multisite tables—Multisite Table_B2 (corresponding to Main Table B of system B), Multisite Table_C1 (corresponding to Main Table C of system C); system B has a main table, Main Table B, and two multisite tables—Multisite Table_A1 (corresponding to Main Table A of system A), Multisite Table_C2 (corresponding to Main Table C of system C); and system C has a main table, Main Table C, and two multisite tables—Multisite Table_A2 (corresponding to Main Table A of system A), Multisite Table_B1 (corresponding to Main Table B of system B).

The techniques involved in replicating data among the systems illustrated in FIG. 2 are similar to those described above. For example, when a change is initiated at system A, the main table, Main table A, is modified accordingly. Also, via replication transactions, the change, e.g., an insertion, deletion, or update of a record, is transmitted to other systems, e.g., systems B and C. In response, the multisite tables, such as Multisite Table_A1 in system B, Multisite table_A2 in system C, are changed accordingly. As described above, replication trigger logic determines whether or not to replicate a change specified in a replication transaction to a main table at a respective site.

Figure 3A:
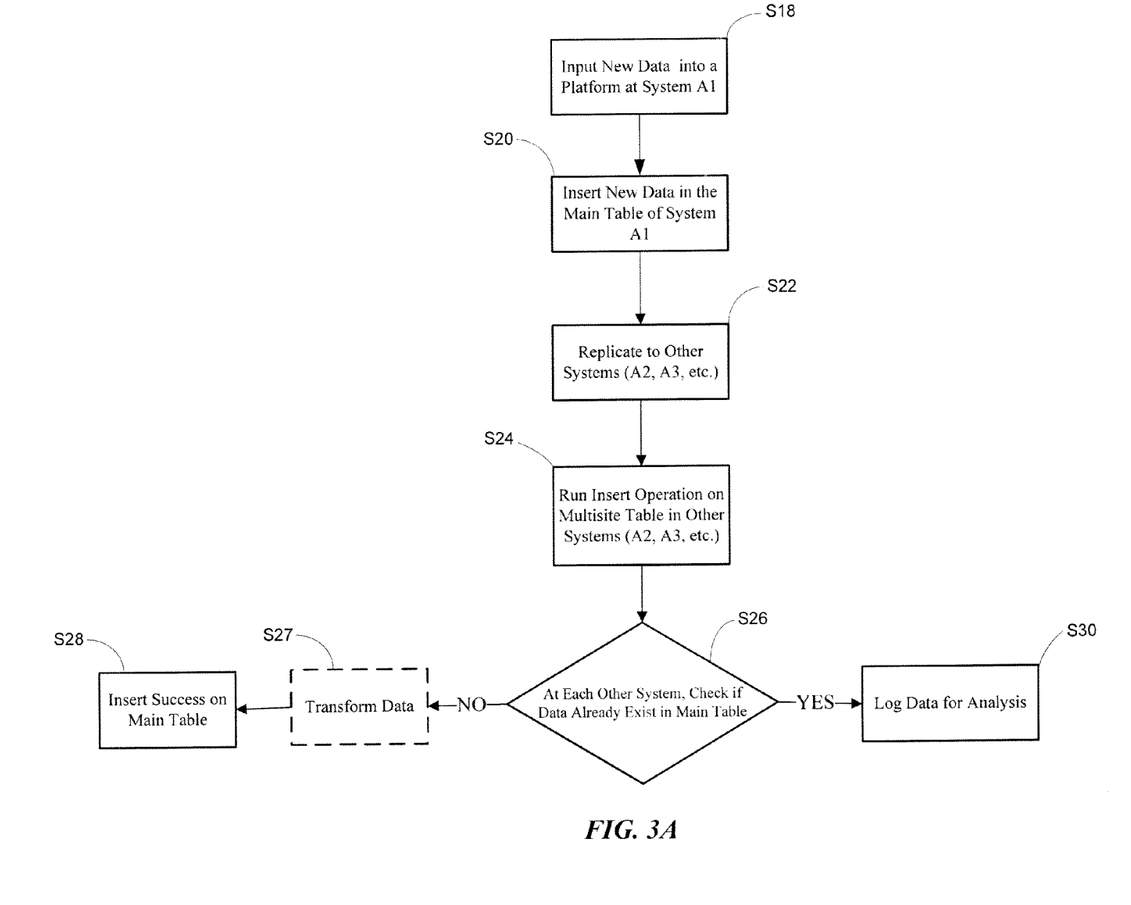
FIG. 3A is a general flowchart illustrating how data relating to an insertion of a new record is replicated between systems.
Figure 3B:
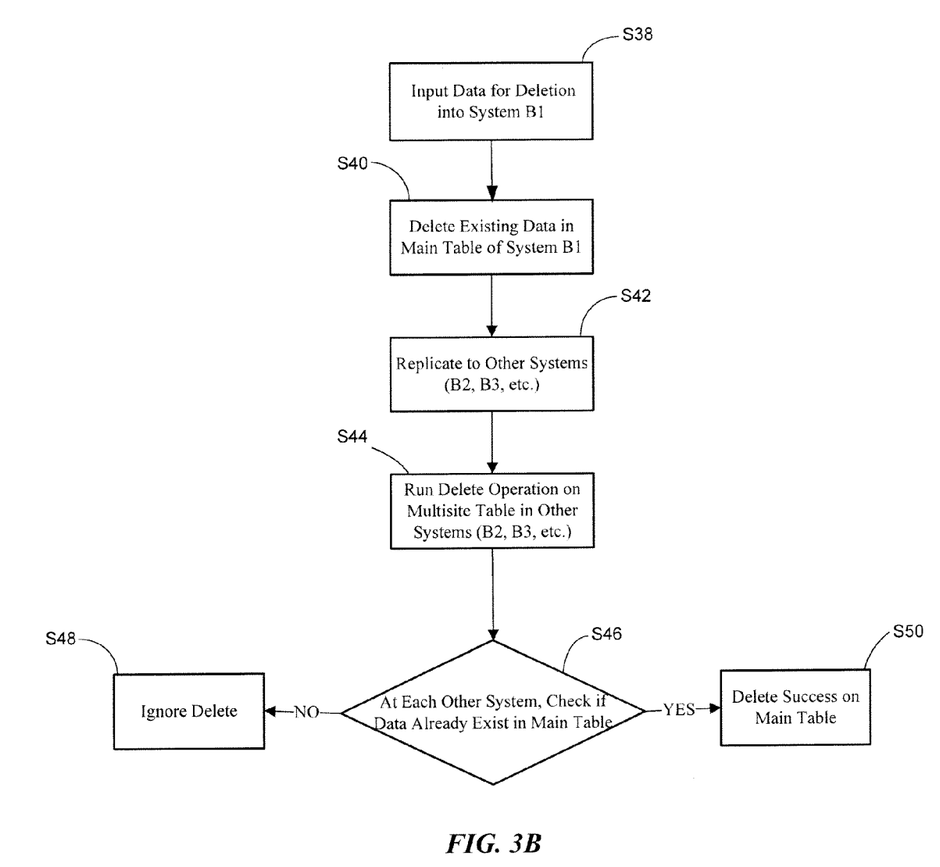
FIG. 3B is a general flowchart illustrating how data relating to a deletion of a record is replicated between systems.
Figure 3C:
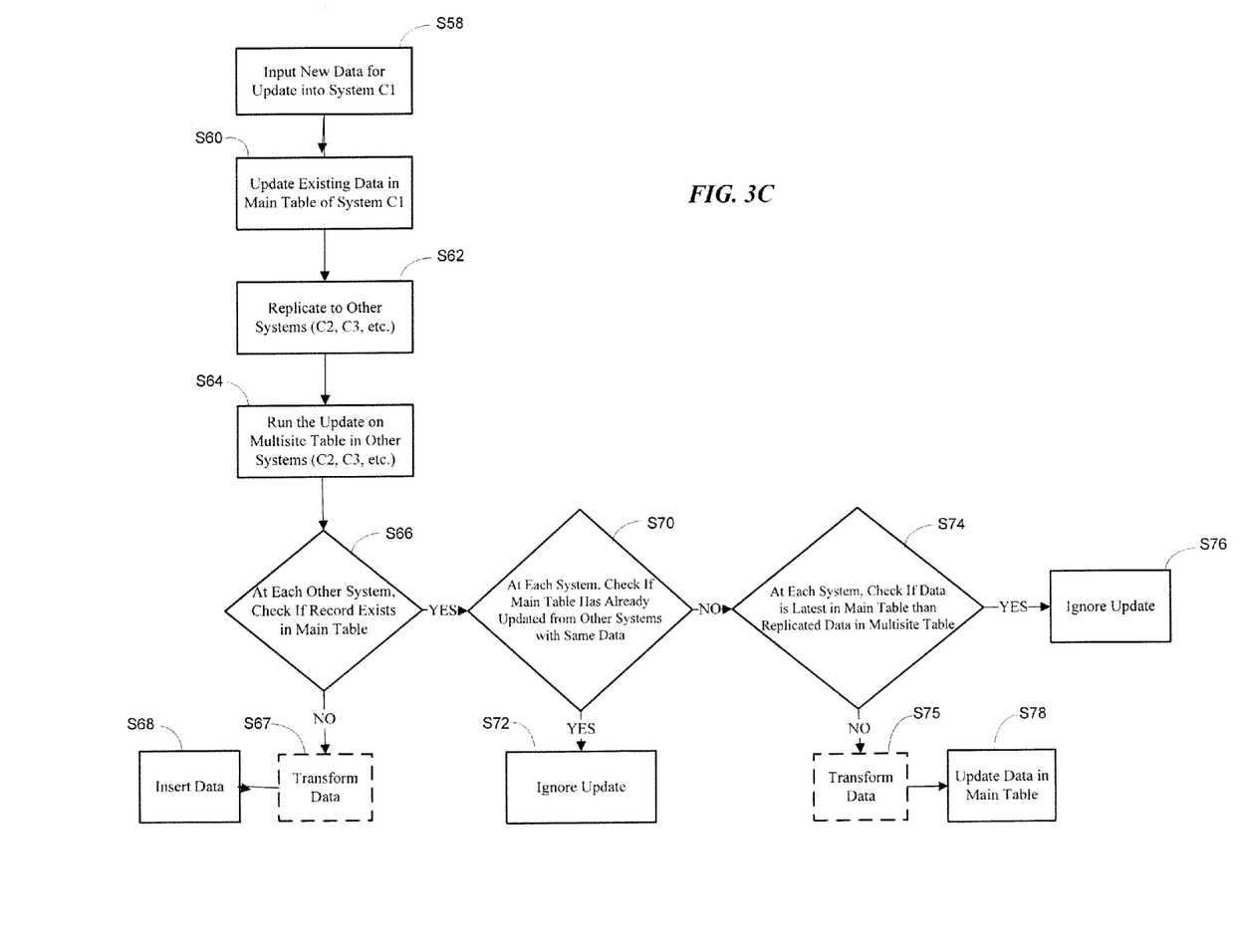
FIG. 3C is a general flowchart of illustrating how data relating to an update of a record is replicated between systems.

FIGS. 3A-3C illustrate examples of how replication trigger logic determines whether or not a change specified in a replication transaction is replicated to a main table.

FIG. 3A is a general flowchart illustrating how data relating to inserting a new record is replicated to other systems, as an example of the disclosed subject matter.

At S18, system A1 receives an input for adding a new record, or other data items, to a main table maintained in system A1. At S20, system A1 inserts the new record into the main table of system A1. At S22, system A1 generates a replication transaction containing information relating to the new record and transmits the replication transaction to other systems (i.e., A2, A3, etc.) that are replicating the data stored in system A1, for adding the new record to the main tables of each system (i.e., A2, A3, etc.). Steps S24-S30 of FIG. 2A illustrate how at each system replication trigger logic processes the replication transaction.

At S24, at each of the other systems, the system (i.e., A2, A3, etc.) receives the replication transaction, and inserts the new record specified in the replication transaction in the respective multisite table corresponding to the main table of system A1. At S26, at each of the other systems, the replication trigger logic determines whether or not to replicate the change specified in the replication transaction to the main table of the respective system. That is, the replication trigger logic checks if the new record information added to the multisite table already exits in the main table. For example, in FIG. 1, the replication trigger logic 28 of system 2 determines whether or not the new record information received from system 1 via the replication transaction 32 already exists in the main table of system 2. At S30, if the new record information added to the multisite table already exists in the main table, then the replication trigger logic generates an "insertion error" and logs the data for future analysis. Otherwise, at S28, if the new record information added to the multisite table is not found in the main table, the replication trigger logic 28 inserts the new record information into the main table (e.g., main tables of systems A2, A3, etc.) at the other sites, thereby completing replication of data from system A1 to systems A2, A3, etc.

Optionally, prior to inserting the new record information into the main table of the respective system, if the main table requires different data formats for the new record information, at S27, the replication trigger logic appropriately transforms data of the new record information before inserting the data into the main table.

FIG. 3B is a general flowchart illustrating how data relating to deleting an existing record is replicated to other systems, as an example of the disclosed subject matter.

At S38, system B1 receives an input for deleting a record, or other data items, in a main table maintained in system B1. At S40, based on the input, system B1 searches for and deletes the record in the main table. At S42, system B1 generates a replication transaction containing information relating to the deleted record in the main table of system B1 and transmits the replication transaction to other systems (i.e., B2, B3, etc.) that are replicating the data stored in system B1, for deleting a record corresponding to the deleted record information in the main tables of each system (i.e., B2, B3, etc.). Steps S44-S50 of FIG. 3B illustrate how at each system replication trigger logic processes the replication transaction.

At S44, at each of the other systems, the system (i.e., B2, B3, etc.) receives the replication transaction from system B1, and deletes a record, corresponding to the deleted record information specified in the replication transaction, in the respective multisite table which corresponds to the main table of system B1. At S46, at each system, the replication trigger logic determines whether or not to replicate the change specified in the replication transaction to the main table of the respective system. That is, the replication trigger logic checks if the record information deleted in the multisite table exits in the main table of the system. For example, in FIG. 1, replication trigger logic 28 of system 2 determines whether or not the record information received from the system 1, via the replication transaction 32, exists in the main table of system 2.

At S48, if a record corresponding to the deleted record information in the multisite table does not exist in the main table, then the replication trigger logic ignores the replication transaction. Otherwise, at S50, if a record corresponding to the deleted record information in the multisite table is found in the main table, then the replication trigger logic deletes the record in the main table of the respective system (e.g., B2, B3, etc.) at the other sites, thereby completing replication of data from system B1 to systems B2, B3, etc. at different sites.

FIG. 3C is a general flowchart illustrating how data relating to updating a record is replicated to other systems, as an example of the disclosed subject matter.

At S58, system C1 receives an input for updating a record in a main table maintained in system C1. At S60, based on the input, system C1 updates the record in the main table of system C1. At S62, system C1 generates a replication transaction containing update information relating to the record updated in the main table of system C1 and transmits the replication transaction to each of the other systems (i.e., C2, C3, etc.) that are replicating the data stored in system C1, for updating the record specified in the replication transaction in the main tables of each of the other systems (i.e., C2, C3, etc.). Steps S64-S78 of FIG. 3C illustrate how at each system replication trigger logic processes the replication transaction.

At S64, at each site, the system (i.e., C2, C3, etc.) receives the replication transaction, and implements the update information specified in the replication transaction in the respective multisite table. That is, based on the update information specified in the replication transaction, the multisite table of each system (i.e., C2, C3, etc.) is changed in accordance with the update information specified in the replication transaction, e.g., a record corresponding to the update information is updated.

At S66, replication trigger logic of each system (i.e., C2, C3, etc.) checks if a record corresponding to the updated record in the multisite table exists in the main table. If the record corresponding to the updated record in the multisite table does not exist in the main table, then, at S68, the replication trigger logic creates and inserts a new record with the update information into the main table. Optionally, prior to inserting the new record into the main table of the respective system, if the main table requires different data formats for the new record, at S67, the replication trigger logic appropriately transforms data of the new record before inserting the data into the main table.

Further, at S70, if a record corresponding to the updated record in the multisite table is found in the main table, the replication trigger logic determines whether the main table has already updated the record with the same data from other systems. If the record has been updated with the same data, at S72, the replication trigger logic ignores the update and discards the replication transaction.

On the other hand, if the replication trigger logic determines that the record has not been updated yet with the same data from the other systems, at S74, the replication trigger logic further determines whether the record information in the main table is latest compared to the record information specified in the replication transaction. That is, the latest data in the multisite tables is used to compare to the data in the main table. If the record information in the main table is not the latest, then, at S78, the record information in the main table is updated with the data in the multisite table. Again, optionally, prior to updating the record in the main table of the respective system, if the main table requires different data formats for the update information, at S75, the replication trigger logic appropriately transforms data of the update information before inserting the data into the main table.

However, if the replication trigger logic determines that the record information in the main table is the latest, then, at S76, the replication trigger logic ignores the update.

At steps S74-S78, the replication trigger logic uses timing information of updates to determine whether or not to replicate an update to the main table (more specifically, e.g., to resolve conflicts between updates). However, other criteria, for example, user, group, or transaction priority, can be used to resolve such conflicts. That is, for example, for conflict resolution, instead of the timing information of the updates, user defined priority can be used. In another example, the replication trigger logic can include conflict resolution procedures implemented by procedural statements based on system priority (e.g., system C1 has a higher priority than systems C2, C3, or etc.) so that in case of conflicts the replication trigger logic applies any update made by system C1 to the main table over other updates made by systems C2, C3, etc.

It is also appreciated by one of ordinary skill in the art that in some implementations timing or priority information may be the sole criteria for conflict resolution, while in other implementations a combination of these and/or other criteria (e.g., identification based, site priority based, user based criteria, etc.) can be used. As mentioned earlier, the conflict resolution procedures are established by procedural statements of the replication trigger logic. In the example, the replication trigger logic (including conflict resolution procedures) is defined and deployed manually at each system (or database); in another example, however, the replication trigger logic can be deployed automatically from a central system or database using a client-server methodology. In addition, examples of the delay in replication times in the different systems can range from several seconds to minutes, for example, after an update is received. Furthermore, instead of the delay time being a predetermined constant time, it may depend on characteristics of the system, such as the load in the system or priority of updating the main table. The times for replicating data in the various systems may be the same or may differ.

Thus, as described above, conflict resolution is made much easier because each system can have its own rule for resolving various types of conflicts through simple procedural statements, providing flexibility to handle various types of transactions. For example, if data is to be transformed or ignored for a particular user, group, system or site, it can be done using procedural statements implementing the replication trigger logic. That is, for example, if changes from a particular system C1 are to be ignored, the replication trigger logic of each system includes procedural statement(s) to ignore the changes from system C1 and thus does not apply any update from system C1 to the main table of each system. In another example, if a particular system requires different data formats in its main table of data, then the replication trigger logic includes the procedural statement(s) to transform the data format of a record into the appropriate data format for the main table. As a result, increased flexibility is provided because the procedural statements can be customized per table and be extended to any database system which has different data structures or tables (e.g., the procedural statements can be used to transform different data structures or tables before applying the changes to the main table of each system).

For further illustration, an example involving update transactions at two systems located at different sites is described below in reference to FIG. 4.

In the illustrated example, a database or table of data containing personal address book information including customer's name and telephone number is replicated between two systems, each located at EastPop and WestPop respectively.

Figure 4:
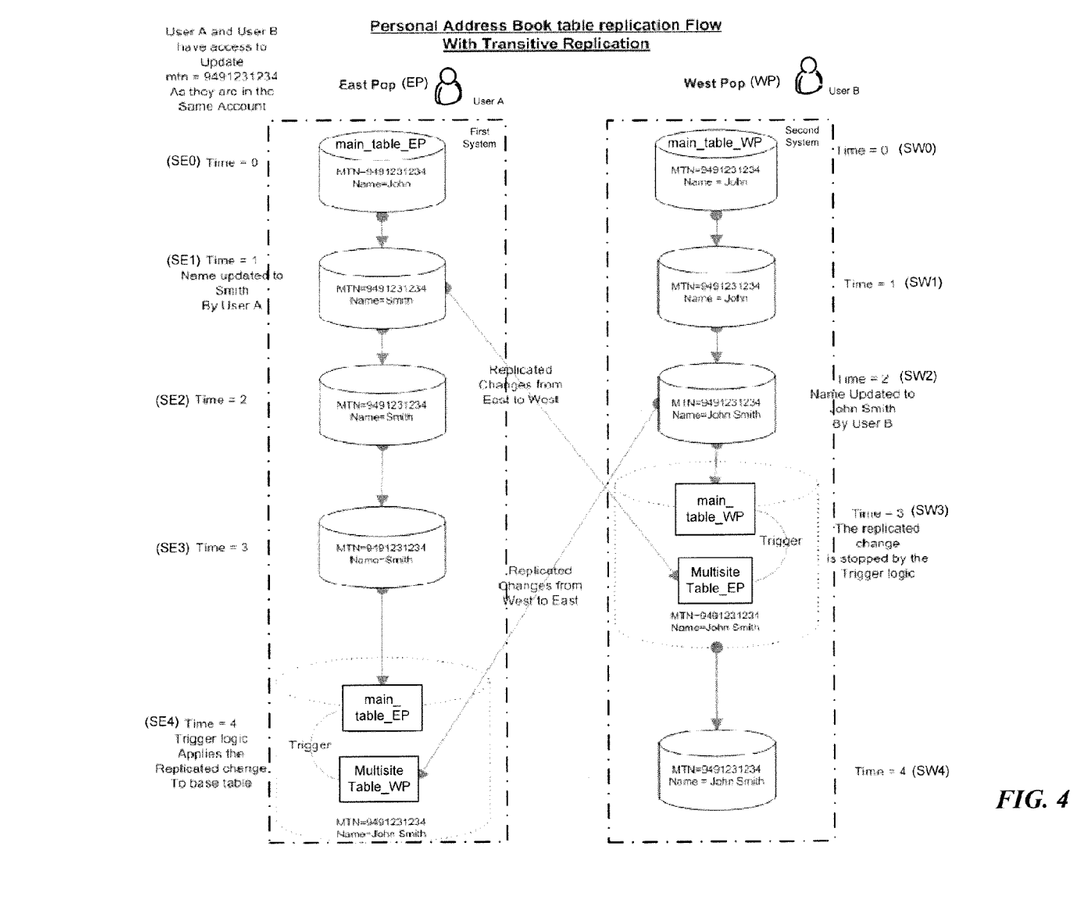
FIG. 4 is a flow diagram showing an example of replicating data relating to an update of a record between two systems.

As shown in FIG. 4, a first system is located at EastPop and contains a main table of data (or a database), main_table_EP; and a second system is located at WestPop and contains a main table of data (or a database), main_table_WP. Both main tables contain, among other information, data such as customer's name ("Name") and his or her mobile telephone number ("MTN"). In addition, each system contains a multisite table of data corresponding to the main table of the other system. That is, the first system at EastPop contains the multisite table of data, Multisite Table_WP, corresponding to the main table of data of the second system at WestPop, main_table_WP. Similarly, the second system at WestPop contains a multisite table of data, Multisite Table_EP, corresponding to the main table of data of the first system at EastPop, main_table_EP. Initially, it is assumed that the main tables and multisite tables contain same duplicate copies of data, and that both users A and B have access to the same information about a customer.

In the example, a sequence of events for replicating update information is illustrated using a hypothetical time line.

At time t=0 (at SE0 and SW0), both main tables (main_table_EP, main_table_WP) contain the same record information for the customer, for example, Name=John, MTN=9491231234 in both main_table_WP and main_table_EP. For the purposes of discussion, it is assumed that the customer's full name is "John Smith," but both main tables contain only first name "John" for the name field (e.g., Name=John).

At time t=1 (at SE1), when the user A at EastPop accesses the first system and inputs for changing the customer's name, e.g., from "John" to "Smith." In response to the user input, a corresponding change is entered in the main table, main_table_EP, and the name field of the customer record in the main table is updated with "Smith" (e.g., a change is made from Name=John to Name=Smith in main_table_EP). When the update is made to the main table, main_table_EP, the first system generates and transmits a first replication transaction, via communication network (not shown), to the second system at WestPop. The second system receives the change via the first replication transaction and, at time t=3 (at SE3), the replication trigger logic applies the change specified in the first replication transaction to the multisite table, Multisite Table_EP. At time t=3 (at SE3), the multisite table, Multisite Table_EP, is updated and contains the updated information, e.g., Name=Smith. However, at this time, the change is not yet replicated to the main table of the second system at WestPop. That is, the replication trigger logic of the second system at WestPop does not immediately apply the change (or update information) to the main table of the second system.

Referring back to time t=1 (at SW1) at the second system, there has been no update to the main table of data, main table WP. That is, at time t=1 (at SW1), the record information of the customer stored in the main table, main_table_WP, still contains the updated information, e.g., Name=John.

At time t=2 (at SW2), however, the user B accesses the second system and inputs for changing the record information of the same customer (e.g., the user B inputs to change the customer's name to "John Smith"). Based on the input, the main table of the second system, main_table_WP, is modified and the main table, main_table_WP, contains Name=John Smith.

At time t=3 (at SW3), the multisite table maintained in the second system, Multisite Table_EP, contains Name=Smith, while the main table, main_table_WP, contains Name=John Smith; and thus the replication trigger logic of the second system determines whether or not to replicate the update information implemented in the multisite table, Multisite Table_EP, to the main table, main_table_WP, based on timing information of both updates. In the example, the replication trigger logic of the second system discards the update implemented in the multisite table and does not replicate the update to the main table of the second system because the update applied to the main table of the second system (e.g., Name=John Smith at time t=2) is latest, or more recent in time, than the update implemented in the multisite table (e.g., Name=John at time t=1). That is, the replication trigger logic of the second system ignores the update specified in the first replication transaction and implements in the multisite table, Multisite Table_EP, the latest update from the main table (e.g., Name=John Smith in Multisite Table_EP).

As a result, at time t=4 (at SW4), both the main table, main_table_WP, and the multisite table, Multisite Table_EP, of the second system contain the same data for the customer record, e.g., Name=John Smith in both main_table_WP and Multisite Table_EP.

Now, referring back to events at the first system, at time t=2 (at SE2) and time t=3 (at SE3), the record information for the customer contained in the main table, main_table_EP, remains the same, e.g., Name=Smith.

At time t=4 (at SE4), however, the first system receives an update information for the customer record via a second replication transaction from the second system. The first system implements the update information in the multisite table, Multisite Table_WP, (e.g., a change of the customer name, from Name=Smith to Name=John Smith, is made in the multisite table). The multisite table of the first system is modified in accordance with the change specified in the second replication transaction. Based on timing information of the update information, the replication trigger logic of the first system determines whether or not to replicate the update to the main table of the first system, main_table_EP. In the example, the replication trigger logic replicates the update information in the main table of the first system because the update information implemented in the multisite table (e.g., Name=John Smith in Multisite Table_WP at time t=2) is latest than the update made to the main table of the first system earlier (e.g., Name=John in main_table_EP at time t=1).

At time t=4 (at SE4), both the main table and the multisite table of the first system thus contain the same data for the customer's name, e.g., Name=John Smith in main_table_EP and Multisite Table_WP.

As a result, at time t=4, both systems at EastPop and WestPop have successfully completed the replication of data (e.g., updates of a record) to each system, thereby ensuring data accuracy and data integrity (e.g., both systems contain the same record information for the customer, Name=John Smith).

In the example above, potential conflicts are prevented by use of multisite tables and associated replication trigger logic; the replication trigger logic performs conflict resolution procedures based on timing information of updates. That is, between two updates the replication trigger logic determines which update to take (or replicate) and discards the other. However, other user defined priority information, as discussed earlier, rather than the timing information of the updates can be used for such conflict resolution. For example, the replication trigger logic can use system priority information for resolving conflicts so that system A has a higher priority over system B; and in this case, in case of conflicts any update made by system A will be chosen over updates made by system B. These decision criteria for replication trigger logic to resolve conflicts are implemented using procedural statements in software and/or hardware.

Figure 5:
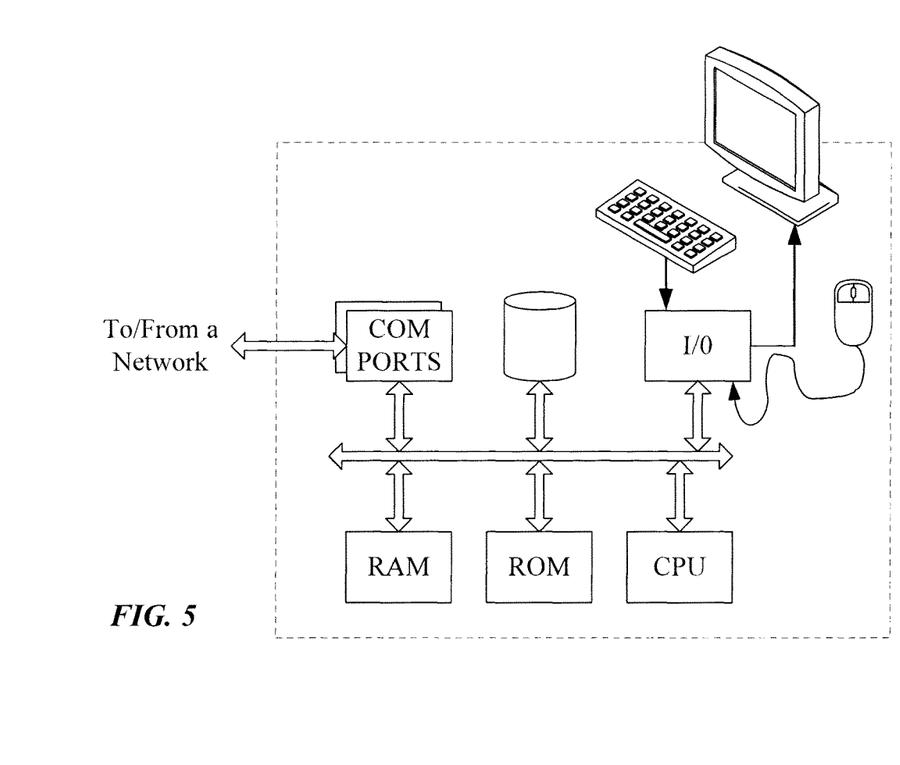
FIG. 5 is a simplified, functional block diagram of a computer system that may implement transitive database replication.

FIG. 5 provides a functional block diagram illustrating a general purpose computer hardware system. FIG. 5 depicts a computer with user interface elements, as may be used to implement a personal computer or other type of work station or terminal device. The computer of FIG. 5 may also act as a server, if appropriately programmed. It is believed that those skilled in the art are familiar with the structure, programming and general operation of such computer equipment and as a result the drawing should be self-explanatory.

A computer system (or system), for example, includes a data communication interface for packet data communication. The computer system also includes a central processing unit (CPU), in the form of one or more processors, for executing program instructions. The computer system typically includes an internal communication bus, program storage and data storage for various data files to be processed and/or communicated by the computer system, although the computer system often receives programming and data via network communications. The hardware elements, operating systems and programming languages of such computer systems are conventional in nature, and it is presumed that those skilled in the art are adequately familiar therewith.

Hence, various aspects of the transitive database replication technique outlined above may be embodied in programming. Program aspects of the technology may be thought of as "products" or "articles of manufacture" typically in the form of executable code and/or associated data that is carried on or embodied in a type of machine readable medium. Storage type media include any or all of the tangible memory of the computers, processors or the like, or associated modules thereof, such as various semiconductor memories, tape drives, disk drives, and the like, which may provide non-transitory storage at any time for the software/hardware programming. All or portions of the software may at times be communicated through the Internet or various other telecommunication networks. Such communications, for example, may enable loading of the software from one computer or processor into another.

Another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the transitive database replication technique, etc. shown in the drawings. Volatile storage media include dynamic memory, such as main memory of such a computer system. Tangible transmission media include coaxial cables, copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards, paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

As used in this specification and any claims of this application, the terms "computer," "server," "processor," and "memory" refer to electronic or other technological devices. These terms exclude people, or groups of people. For the purposes of the specification, the terms "display" or "displaying" means displaying on an electronic device.

It is understood that any specific order or hierarchy of steps in the processes or techniques disclosed is an example. Based on design preferences, it is understood that the specific order or hierarchy of steps in the processes may be rearranged. Some of the steps may be performed simultaneously. For example, in certain circumstances, multitasking and parallel processing may be advantageous. Moreover, the separation of various system components in the examples described above should not be understood as requiring such separation in all examples, and it should be understood that the described program components and systems can generally be integrated together in a single software product or packaged into multiple software products.

A phrase such as an "aspect" does not imply that such aspect is essential to the subject technology or that such aspect applies to all configurations of the subject technology. A disclosure relating to an aspect may apply to all configurations, or one or more configurations. In addition, such aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. Such configuration may refer to one or more configurations and vice versa.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings. All structural and functional equivalents to the elements of the various aspects described throughout this disclosure that are known or later come to be known to those of ordinary skill in the art are expressly incorporated herein by reference and are intended to be encompassed by the claims.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A database replication method, comprising steps of:
   in a first computer system, maintaining both a first main table of data for the first computer system and a first multisite table of data for a second computer system, the first multisite table of data maintaining a copy of data stored in a second main table of data on the second computer system, wherein the second computer system further includes a second multisite table of data maintaining a copy of data stored in the first main table of data of the first computer system, wherein the first main table of data and the first multisite table of data include the same types of data;
   in response to an input for changing the first main table of data for the first computer system:
     (a) changing the first main table of data for the first computer system based on the input; and
     (b) sending a first replication transaction from the first computer system to the second computer system, wherein the first replication transaction indicates the change in the first main table of data for the first computer system;
   receiving, by the first computer system, a second replication transaction from the second computer system, the second replication transaction indicating a change in the second main table of data on the second computer system;
   entering the second replication transaction received from the second computer system in the first multisite table of data in the first computer system; and
   determining whether to replicate the entered second replication transaction into the first main table of data of the first computer system from the first multisite table of data in the first computer system, based on application of replication trigger logic to the entered second replication transaction, the replication trigger logic being stored on the first computer system and configured to compare current data in the first main table of data of the first computer system with the entered second replication transaction in the first multisite table of data in the first computer system.

2. The database replication method of claim 1, wherein the second replication transaction received from the second computer system is one of:
   an insert transaction corresponding to inserting a first record into the second main table of data of the second computer system,
   a deletion transaction corresponding to deleting a first record of the second main table of data of the second computer system, and
   an update transaction corresponding to updating a first record of the second main table of data of the second computer system.

3. The database replication method of claim 1, wherein the replication trigger logic includes procedural statements for the first main table of data of the first computer system for conflict resolution.

4. The database replication method of claim 1, wherein in the determining step, the application of the replication trigger logic to the second replication transaction is based on timing information of the change corresponding to the second replication transaction.

5. The database replication method of claim 1, wherein in the determining step, the application of the replication trigger logic to the second replication transaction is based on a priority associated with the change corresponding to the second replication transaction.

6. The database replication method of claim 1, further comprising transforming data contained in the second replication transaction before replicating the second replication transaction in the first main table of data of the first computer system.

7. A first computer system, comprising:
   a processor;
   an interface accessible to the processor for data communication;
   storage accessible to the processor;
   a first main table of data for the first computer system, maintained in the storage;
   a first multisite table of data for a second computer system, the first multisite table of data maintaining a copy of data stored in a second main table of data on the second computer system, the first multisite table of data maintained in the storage of the first computer system, the second computer system being different from the first computer system, wherein the second computer system further includes a second multisite table of data maintaining a copy of data stored in the first main table of data of the first computer system;

a change module for modifying the first main table of data of the first computer system based on an input for changing the first main table of data of the first computer system;
replication logic for the processor; and
replication trigger logic for the processor,
wherein:
the first main table of data and the first multisite table of data of the first computer system include the same types of data;
the replication logic configures the first computer system for performing functions, including functions to:
in response to the input for changing the first main table of data of the first computer system:
send a first replication transaction, indicating the change in the first main table of data of the first computer system, from the first computer system to the second computer system different from the first computer system;
receive, by the first computer system, a second replication transaction from the second computer system, indicating a change in the second main table of data on the second computer system;
enter the second replication transaction received from the second computer system in the first multisite table of data maintained in the storage of the first computer system; and
determine whether to replicate the entered second replication transaction into the first main table of data of the first computer system from the first multisite table of data in the first computer system, based on application of the replication trigger logic to the entered second replication transaction, by comparing current data in the first main table of data of the first computer system with the entered second replication transaction in the first multisite table of data in the first computer system.

8. The first computer system of claim 7, wherein the received second replication transaction is one of:
an insert transaction corresponding to inserting a first record in the second main table of data of the second computer system,
a delete transaction corresponding to deleting a first record of the second main table of data of the second computer system, and
an update transaction corresponding to updating a first record of the second main table of data of the second computer system.

9. The first computer system of claim 7, wherein the replication trigger logic includes procedural statements for the first main table of data of the first computer system for conflict resolution.

10. The first computer system of claim 7, wherein the application of the replication trigger logic to the second replication transaction is based on timing information of the change corresponding to the second replication transaction.

11. The first computer system of claim 7, wherein the application of the replication trigger logic to the second replication transaction is based on a priority associated with the change corresponding to the second replication transaction.

12. The first computer system of claim 7, wherein the replication logic configures the first computer system for performing a function to transform data contained in the second replication transaction before replicating the second replication transaction in the first main table of data of the first computer system.

13. A database system, comprising:
a plurality of computer systems, each respective computer system comprising:
a non-transitory storage device;
a main table of data in the non-transitory storage device, for data at a first site of the respective computer system;
a multisite table of data at the first site in the non-transitory storage device maintaining a copy of data stored in a further main table of data on a further computer system at a second site, wherein the further computer system includes a further multisite table of data maintaining a copy of data stored in the main table of data of the respective computer system,
wherein:
the main table of data and the multisite table of data include the same types of data, and
a replication transaction, indicating a change in the further main table of data of the further computer system at the second site, is received by the respective computer system at the first site from the further computer system at the second site, and is entered in the multisite table of data in storage in the respective computer system at the first site before implementing the entered replication transaction in the main table of data of the respective computer system; and
replication trigger logic for determining whether to implement the entered replication transaction in the main table of data of the respective computer system from the multisite table of data in the respective computer system at the first site, by comparing current data in the main table of data of the respective computer system with the entered replication transaction in the multisite table of data in the respective computer system at the first site.

14. The database system of claim 13, wherein the replication transaction is one of:
an insert transaction corresponding to inserting a first record in the further main table of data of the further computer system at the second site,
a deletion transaction corresponding to deleting a first record in the further main table of data of the further computer system at the second site, and
an update transaction corresponding to updating a first record in the further main table of data of the further computer system at the second site.

15. The database system of claim 13, wherein the replication trigger logic includes procedural statements for the main table of data of the respective computer system for conflict resolution.

16. The database system of claim 13, wherein the replication trigger logic uses timing information of the change corresponding to the replication transaction in determining whether to implement the replication transaction in the main table of data of the respective computer system.

17. The database system of claim 13, wherein the replication trigger logic uses a priority associated with the change corresponding to the replication transaction in determining whether to implement the replication transaction in the main table of data of the respective computer system.

18. The database replication method of claim 1, wherein the first main table of data and the first multisite table of data include substantially the same information comprising customer account related data.

19. The database replication method of claim 1, wherein the same types of data comprise customer-related information including customer names.

20. The first computer system of claim 7, wherein the first main table of data and the first multisite table of data of the first computer system include substantially the same information including customer account-related data.

21. The database system of claim 13, wherein the main table of data and multisite table of data of the respective computer system include substantially the same information including customer account-related data.

* * * * *